Oct. 3, 1967    M. H. RIPPLE    3,344,829
GASKET ARRANGEMENT FOR BLENDER CONTAINERS
Filed Oct. 22, 1965    3 Sheets-Sheet 1
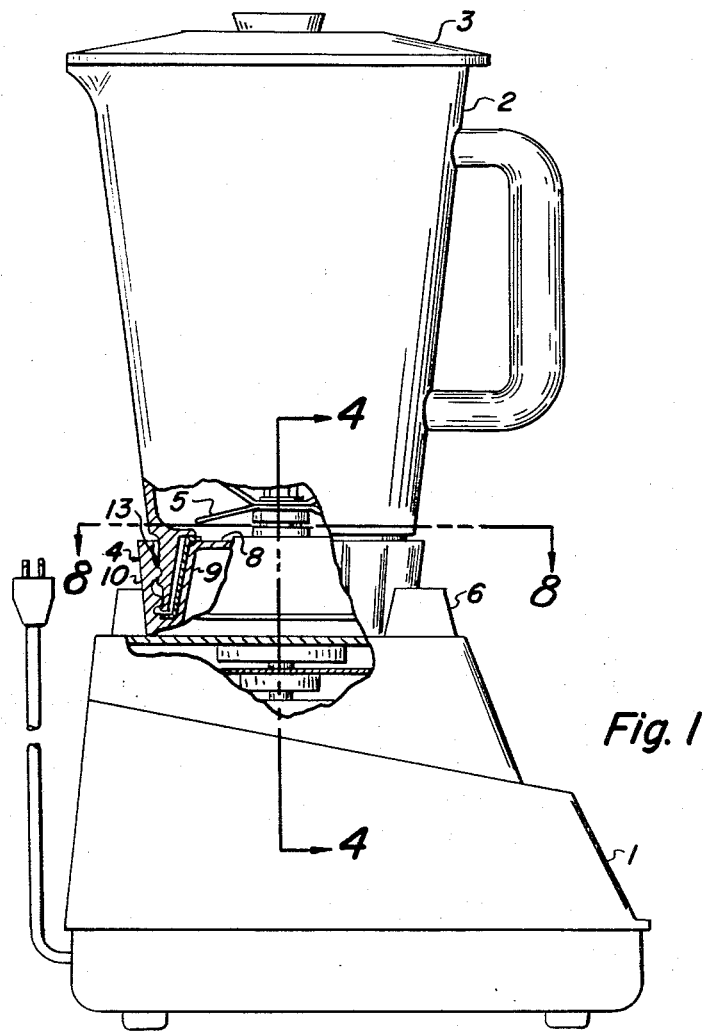
Fig. 1
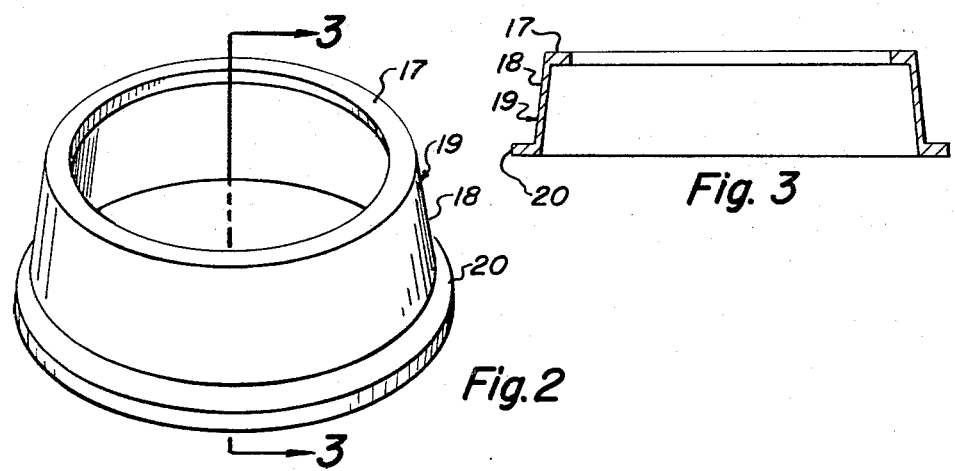
Fig. 2
Fig. 3

Oct. 3, 1967   M. H. RIPPLE   3,344,829
GASKET ARRANGEMENT FOR BLENDER CONTAINERS
Filed Oct. 22, 1965   3 Sheets-Sheet 3

United States Patent Office 3,344,829
Patented Oct. 3, 1967

3,344,829
GASKET ARRANGEMENT FOR BLENDER CONTAINERS
Melvin H. Ripple, North Canton, Ohio, assignor to The Hoover Company, North Canton, Ohio, a corporation of Ohio
Filed Oct. 22, 1965, Ser. No. 501,977
6 Claims. (Cl. 146—68)

The present application relates to a gasket arrangement for blender containers which have removable bases. In modern blender design it is conventional to have a removable base on the container. The removable base provides a mounting for the cutters. Thus, when sticky material is mixed in the blender the base may be removed for thorough cleaning of the cutters and the area around the cutter mounting shaft. It is also conventional in modern blender design to form the blender container and the removable base with standard Mason jar threads. This is especially convenient when mixing things which will not be used up all at one time. For example, when grinding coffee beans, or blending fruit such as apples or peaches for use as baby food it is advantageous to place the material in a standard Mason jar and screw the removable blender container base right onto the Mason jar. The materials are then mixed right in a handy storage container and a large supply may be mixed without the need of transferring materials from the blender container to a storage container.

With such a removable container base it is imperative that the gasket arrangement be capable of functioning with both a blender container and with Mason jars. The gasket arrangement is important to keep liquid from seeping out of the container and running onto the power unit where it might cause damage to the electrical wiring or the motor. Also, the gasket should seal well with the blender container and provide no openings in which food particles may become trapped. A housewife may simply rinse the blender container at times instead of removing the base and cleaning everything thoroughly. Any particles of food which are not removed by rinsing create a hazard of ptomaine poisoning the next time the blender is used. Thus, it is important that the gasket arrangement for the blender container be one which will not permit food particles to become trapped against removal by rinsing. At the same time, it is necessary that the gasket arrangement be suitable for effectively sealing a standard Mason jar.

Therefore, it is a principal object of this invention to provide a gasket arrangement for blender containers which have removable bases.

It is a further object of this invention to provide such a gasket arrangement which prevents food particles from becoming trapped when the blender container is washed by simply rinsing.

It is another object of this invention to provide such a gasket arrangement which will function effectively whether the removable container base is used with a specially designed blender container or with a standard Mason jar.

Other objects and advantages of the present invention will be apparent as the description proceeds when taken in connection with the accompanying drawings wherein:

FIG. 1 is an elevational view of a blender power unit and container with a portion cut away to show the present invention.

FIG. 2 is a perspective view of the gasket used in the present invention.

FIG. 3 is a sectional of the gasket taken in the direction of arrows 3—3 of FIG. 2.

Figure 4:
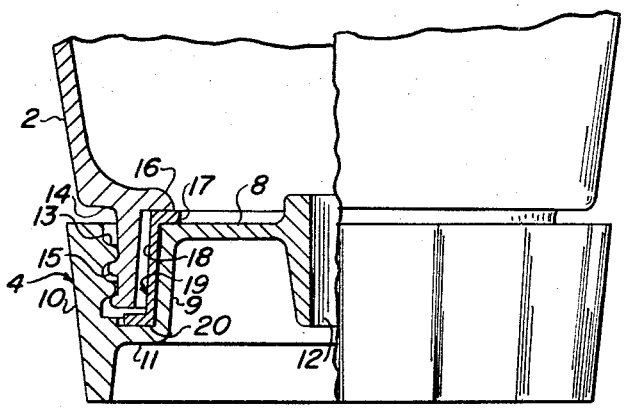
FIG. 4 is a partial sectional view taken on line 4—4 of FIG. 1 with portions omitted for clarity.

Referring now to the drawing FIG. 1 shows a conventional and well known type of blender including a power unit housing 1 and a container 2. Container 2 has a removable cover 3 to keep materials from splashing out of the container during blending operations. Container 2 has a removable base 4 screw threaded onto the bottom thereof. The screw threads formed on the bottom of container 2 and base 4 are standard Mason jar threads. Base 4 provides a mounting for the shaft on which cutters 5 are secured. Cutters 5 are driven through a separable coupling between an electric motor mounted in housing 1 and the shaft on which cutters 5 are secured. Container 2, along with base 4, is freely removable from housing 1 and placement of container 2 and base 4 on housing 1 automatically connects a separable drive for cutters 5. Projections as at 6 on housing 1 fit into recessed portions as at 7 in FIG. 8 on the outer periphery of base 4 to hold base 4 and container 2 against rotation while cutters 5 are operating.

Figure 8:
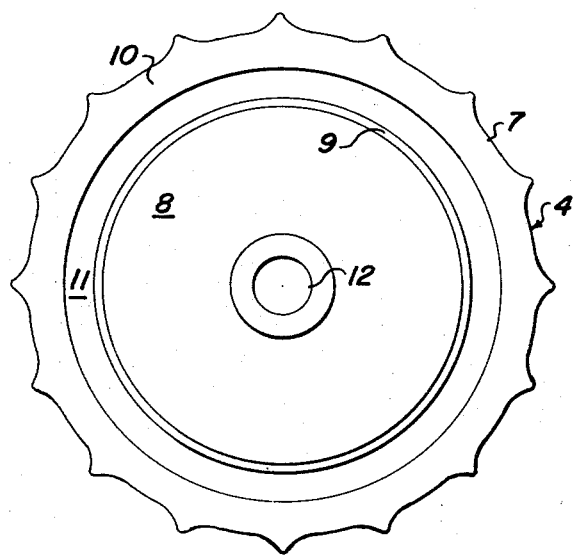
FIG. 8 is a top view taken on line 8—8 of FIG. 1 with parts omitted for clarity.

Base 4 has a substantially flat circular center portion 8 as shown in FIGS. 4 and 8. Projecting downwardly from the outer periphery of portion 8 is an inner circumferential wall 9. An outer circumferential wall 10 is spaced radially outward from wall 9, and a substantially horizontal circumferential wall 11 connects walls 9 and 10. A bore 12 is formed in the center of circular portion 8 for rotatably mounting the shaft on which cutters 5 are secured. Base 4 is preferably cast in one piece from aluminum and could also be cast from any suitable synthetic plastic material. The inner surface of outer wall 10 is formed with screw threads 13 which correspond to the threads on a standard cover for a Mason jar. Container 2 has a circular bottom portion 14 which is formed on its exterior surface with threads 15 corresponding to the threads on a standard Mason jar. Bottom portion 14 of container 2 is receivable in the space between walls 9 and 10 by rotating base 4 with threads 13 and 15 engaged. At the top of bottom portion 14 container 2 has a circular inwardly projecting shoulder 16 formed thereon. The bottom side of shoulder 16 seals against top flange 17 projecting inwardly from the top of retaining wall portion 18 of gasket 19. The space between walls 9 and 10 on base 4 has a depth as measured from the top of circular portion 8 which is greater than the length of bottom portion 14 on container 2 so that shoulder 16 will always seal against flange 17 before the bottom edge of bottom portion 14 hits flange 20 projecting outwardly from the bottom edge of retaining wall portion 18 of gasket 19.

Gasket 19 is preferably made of rubber or other elastomeric material and the inside diameter of retaining wall portion 18 is slightly less than the outside diameter of inner wall 9 on base 4. Thus, gasket 19 must be stretched slightly to place it in position on base 4 and the circumferential stress in retaining wall portion 18 causes it to tightly hug inner wall 9 on base 4 and hold the gasket in proper position and prevent accidental displacement of gasket 19 when removing base 4 from container 2. When gasket 19 is in position on base 4 top flange 17 lies against the top periphery of circular portion 8 and bottom flange 20 lies against horizontal wall portion 11. The excellent seal provided by shoulder 16 pressing gasket 19 against the periphery of circular portion 8 virtually eliminates the possibility of any food particles being lodged in the bottom of container 2. The seal affords no openings or cracks into which food particles can be forced under the action of cutters 5.

Figure 5:
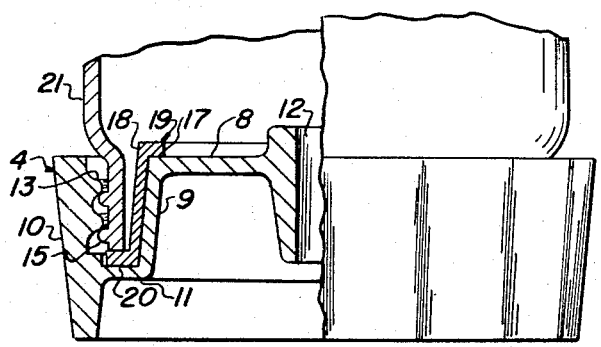
FIG. 5 is a view similar to FIG. 4 and showing a different container.

FIG. 5 shows the same base 4 and gasket 19 of FIG. 4 but with a standard Mason jar 21 positioned on base 4. In this arrangement base 4 is screwed onto jar 21 until the top edge of the jar abuts flange 20 on gasket 19 and presses flange 20 tightly against horizontal wall 11 on base 4. This seal prevents any material from escaping while cutters 5 are rotating and as base 4 is always removed from jar 21 when a mixing operation is completed it is a simple operation to rinse base 4 clean before replacing it on container 2. Thus, a highly effective seal is provided both with special container 2 and with standard jar 21. There are no additional parts to add when changing from one container to another and the base does not have to be removed from container 2 each time a mixing operation is performed because there are no cracks in which food particles may become lodged.

Figure 6:
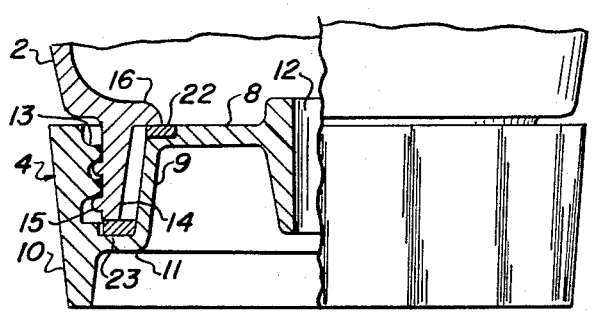
FIG. 6 is a view similar to FIG. 4 and showing a modified gasket arrangement.

FIG. 6 shows the same base 4 as FIGS. 4 and 5 but with a different gasket arrangement. The periphery of circular portion 8 is recessed to provide a mounting for gasket 22. A separate gasket 23 is positioned against wall 11 at the bottom of the space between walls 9 and 10. FIG. 6 also shows that if desired the parts may be dimensioned so that a double seal is effected when using container 2. Container 2 may seal against both gasket 22 and 23.

Figure 7:
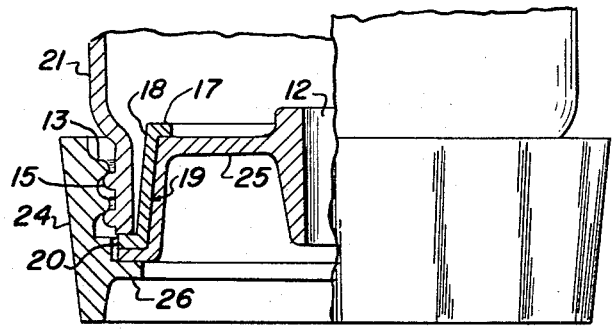
FIG. 7 is a view similar to FIG. 4 and showing a different container and a modified base.

FIG. 7 shows a two piece base member comprising outer part 24 and inner part 25. In this arrangement, part 25 is inserted into jar 21 or container 2 and then outer part 24 is screwed on. A projection 26 on outer part 24 abuts the outer edge of inner part 25 as shown and a seal is provided with either gasket flange 17 or 20 depending on whether jar 21 or container 2 is being used.

It is preferable to use a one piece gasket as in FIGS. 4, 5 and 7 rather than two separate gaskets as in FIG. 6 because top gasket 22 in FIG. 6 must normally be removed when using a jar 21 or the action of material being mixed will displace gasket 22 and cutters 5 will damage it. It is possible to use adhesive to secure gasket 22 in place, but this creates a more difficult assembly operation and the materials mixed in the blender will attack the adhesive after a period of time.

The preferred embodiment is that shown in FIGS. 4 and 5, and the other embodiments show alternatives which are not as effective as the preferred embodiment.

While only a few embodiments of the present invention have been shown and described, it is to be understood that these embodiments are only illustrative and are not to be taken in a limiting sense. The present invention includes all equivalent variations of the disclosed embodiment and is limited only by the scope of the claims.

I claim:

1. A base assembly for blender containers or the like comprising a base member having a substantially flat circular portion with an opening through the center thereof for mounting a cutter shaft, an inner circumferential wall depending from the periphery of said circular portion, and a substantially horizontal circumferential wall projecting outwardly from the bottom edge of said inner wall, the improvement comprising; circular top gasket means positioned on the top periphery of said circular portion and circular bottom gasket means positioned on said horizontal circumferential wall.

2. The assembly of claim 1 and further including retaining wall means formed integrally with said top and bottom gasket means, said retaining wall means being under circumferential stress and tightly embracing the outer surface of said inner circumferential wall, said top and bottom gasket means and said retaining wall means being formed of elastomeric material.

3. The assembly of claim 2 and further including an outer circumferential wall projecting upwardly from the outer edge of said horizontal wall, said outer wall being formed with screw threads on its interior surface corresponding to the threads on the cover of a standard canning jar.

4. The assembly of claim 3 and further including a container having an open top and open bottom, the exterior surface of the bottom of said container having screw threads formed thereon corresponding to the threads on a standard canning jar, a circumferential shoulder formed on the interior of said container a small distance above the bottom edge thereof and projecting inwardly toward the center of said container, said circular portion of said base member being received in the open bottom of said container with said screw threads on said container and said outer wall being interdigitated, and said shoulder being in compressive engagement against said top gasket means.

5. The assembly of claim 1 and further including an outer circumferential wall projecting upwardly from the outer edge of said horizontal wall, said outer wall being formed with screw threads on its interior surface corresponding to the threads on the cover of a standard canning jar.

6. The assembly of claim 5 and further including a container having an open top and open bottom, the exterior surface of the bottom of said container having screw threads formed thereon corresponding to the threads on a standard canning jar, a circumferential shoulder formed on the interior of said container a small distance above the bottom edge thereof and projecting inwardly toward the center of said container, said circular portion of said base member being received in the open bottom of said container with said screw threads on said container and said outer wall being interdigitated, and said shoulder being in compressive engagement against said top gasket means.

References Cited

UNITED STATES PATENTS

| | | | |
|---|---|---|---|
| 2,940,738 | 6/1960 | Posener et al. | 259—107 |
| 2,992,715 | 7/1961 | Blachly | 146—68 X |

WILLIAM W. DYER, Jr., *Primary Examiner.*

JAMES M. MEISTER, *Examiner.*